United States Patent [19]

Degnan

[11] 4,161,125
[45] Jul. 17, 1979

[54] AIRCRAFT CONTROL SYSTEM COMPONENT WITH IMPROVED BALLISTIC TOLERANCE

[75] Inventor: William G. Degnan, Huntington, Conn.

[73] Assignee: United Technologies Corporation, Hartford, Conn.

[21] Appl. No.: 848,953

[22] Filed: Nov. 7, 1977

[51] Int. Cl.² .................... G05G 1/04; G05G 7/00; F41H 5/04
[52] U.S. Cl. ..................................... 74/469; 74/559; 89/36 A; 109/82; 403/11; 428/117; 428/911
[58] Field of Search ................. 74/469, 519, 559; 2/2.5; 89/36 A; 109/49.5, 82, 84, 85; 403/11; 428/116, 117, 118, 416, 418, 911

[56] References Cited

U.S. PATENT DOCUMENTS

| | | | |
|---|---|---|---|
| 2,102,325 | 12/1937 | Kylstra | 29/148.2 |
| 3,098,723 | 7/1963 | Micks | 29/183.5 |
| 3,238,811 | 3/1966 | Longstreth | 74/579 |
| 3,362,252 | 1/1968 | Ditlinger | 74/579 |

*Primary Examiner*—Allan D. Herrmann
*Attorney, Agent, or Firm*—Vernon F. Hauschild

[57] ABSTRACT

An aircraft control system component, such as a bellcrank, having sideplate members of three-ply laminates bonded together with an elastomer-modified epoxy, with the thickness of the central ply twice the thickness of the end plies, and with the outboard end ply being of selected thickness and yield strength so that when petalling occurs therein due to the passage of a projectile therethrough, the petals are deformable under control loads when they come in contact thereafter with associated parts to thereby permit the control system to continue to perform its function due to the improved ballistic tolerance of the component.

25 Claims, 13 Drawing Figures

AIRCRAFT CONTROL SYSTEM COMPONENT WITH IMPROVED BALLISTIC TOLERANCE

FIELD OF THE INVENTION

This invention relates to an aircraft control system in which the surface or part under control is connected to a pilot or automatic control input by a series of interlinked, relatively movable members, such as bellcranks, idlers, rods, etc., and more particularly to a component of such a system which is fabricated to be of improved ballistic tolerance so that the system remains operable to continue its control function after a projectile has passed through the component.

DESCRIPTION OF THE PRIOR ART

Much effort has been expended in the prior art to improve armament for use on aircraft, ships, etc., but the theory behind armament is to fabricate a part so that it will resist a projectile passing therethrough and hopefully repel the projectile. Prior art typical of this armament construction and objective are U.S. Pat. Nos. 3,179,553 to Franklin, 3,604,374 to Matson, and 3,962,976 to Kelsey. The shortcoming of armament is that armament fabricated to repel a particular caliber of projectile becomes ineffective when higher caliber projectiles are used thereagainst and eventually, especially in the aircraft field, the armor plating cannot be strengthened by increasing its volume beyond a practical limit because the flight vehicle must be capable of becoming airborne and must be capable of carrying personnel and/or cargo as required.

Bellcranks and other aircraft control components have previously been fabricated from aluminum alloy castings and/or steel or aluminum forgings which tend to shatter when impacted by small arms fire, thereby requiring redundant systems and/or armor plate resulting in a considerable cost and weight penalty.

My teaching is to be distinguished from the armament art in that my objective is not to fabricate parts so that they will not repel projectiles but so that the part can survive ballistic impact and remains operable to perform its intended function after a projectile has passed therethrough.

SUMMARY OF INVENTION

A primary object of the present invention is to provide an aircraft control system component which is capable of continued operation after a projectile has impacted it and passed therethrough.

In accordance with the present invention, the aircraft control system component is fabricated of bonded laminates with the outboard or projectile exit laminate of selected thickness and yield strength so that the petals which are created therein by a projectile impacting thereagainst passing therethrough are deformed when the petals come into contact under control pressure with associated parts following such damage to avoid secondary jamming of the control system and to permit continued operation of the control system with the petals so deformed.

In accordance with a further aspect of the present invention, the component is preferably made of sideplate members of three-ply laminates with the center ply twice the thickness of the end plies and with the plies bonded together by an elastomer-modified epoxy to thereby improve the strength of the component and to permit operation of the component following ballistic damage to provide the best compromise between survivability and redundancy.

It is a further object of this invention to provide such a component with improved ballistic tolerance and survivability without increasing volume or weight thereof and at reduced cost by use of laminate sheet metals rather than fully-machined forgings of the same alloy.

It is a further object of this invention to provide such a component of improved ballistic tolerance utilizing bonded laminates to strengthen the component by taking advantage of the high plane-stress fracture toughness of sheet material, which is several times the value of the lower plane-strain of heavy forgings.

It is still a further object of this invention to teach such a component in which this three-ply laminate construction with elastomer-modified epoxy bonding achieves greater ballistic damage tolerance through higher ballistic resistance, lower lateral damage and increased ballistic shock reflection at the interfaces between the laminates and the adhesive.

It is a further object to provide such an aircraft control component which is fabricated of laminates so bonded so as to be of improved strength over a monolithic construction and therefore capable of absorbing greater ballistic damage without failure and whose exit plate has petals formed therein which are deformable under control pressure by interference with cooperating parts following ballistic damage to permit continued operation of the system.

A further object is to increase ballistic tolerance or survivability without losses in performance and at reduced cost.

It is an important objective to fabricate one or more components of a flight essential system of bonded laminates, rather than monolithic construction so as to reduce ballistic damage effects by a ratio of 5:1 and thereby enhance the survivability of the component by avoiding secondary jam conditions from petals formed in the exit laminate so that the system remains operative rather than being inactivated by a single projectile hit on one of its components.

Other objects and advantages of the present invention may be seen by referring to the following description and claims, read in conjunction with the accompanying drawings.

DESCRIPTION OF THE PREFERRED EMBODIMENT

To best understand my invention, it is deemed advisable to first explain the results of my research in a study of ballistic tolerance in aircraft components and then explain how I have applied the results of this research to a practical embodiment.

It is conventional practice to connect a remote surface or part under control, such as a helicopter tail rotor or aileron, to the pilot control stick or an automatic control through a series of interconnected bellcranks, idlers and connecting rods so that the control input imparted by the pilot or automatic control is reflected through the interconnecting system to faithfully control the part under control. If ballistic damage causes the interconnecting system to fail or to become jammed, the control function is no longer performed. It was accordingly the aim of my research to study ballistic damage and utilize such findings to provide improved ballistic tolerance in the components of such systems.

Since a bellcrank is a readily understood mechanism and a typical component in such a control system, I shall be describing my research and the application of the results thereof in terms of a bellcrank but it will be evident to those skilled in the art that any such control components may be fabricated following my teachings.

Bellcranks, in the past, have been fabricated to have sufficient strengths to react the control load being imparted thereto by the pilot and to transmit that load to the part under control through the interconnecting linkage system. Bellcranks have conventionally been made of solid metal of selected strength, such as forged or cast aluminum, to carry this control load.

Ballistic testing of such one-piece, solid construction bellcranks, called monolithic construction, reveals that, the failure mode as the projectile impacts and passes through this monolithic construction is a brute-force mode, that is, a shear punch-out of a volume of metal approximately the diameter of the projectile, followed by a wedging effect of the projectile which adds to the shock stresses in the structure and leads to cracking and delaminations away from the hole or "print" made by the projectile. The result is the formation of a metallic split along the central portion of the monolithic construction 10, for example at 12 in FIG. 1, and substantial damage and removal of metal both on the projectile entry side, such as at 14, and the projectile exit side, such as at 16, thereof. This severe ballistic damage to the monolithic construction seriously weakens the component and in all likelihood, would cause failure to a component such as a monolithic bellcrank.

Figure 1:
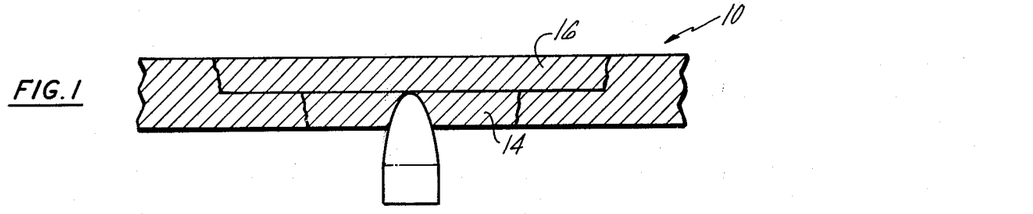
FIG. 1 is a showing of a monolithic plate member to illustrate ballistic damage caused by a projectile impacting and passing therethrough.
Figure 2:
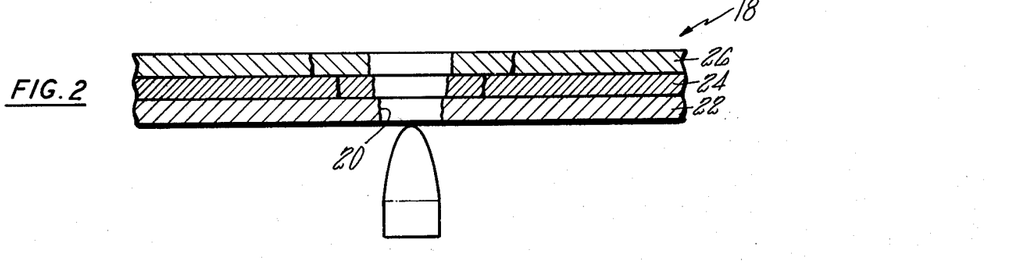
FIG. 2 is a showing of a plate member comprising three equal thickness laminates bonded together to illustrate ballistic damage caused by a projectile impacting and passing therethrough.

Research included in the ballistic testing of laminated structures, such as the three-ply or laminate structure 18 shown in FIG. 2 having three laminates of equal thickness, and being of the same total thickness as the monolithic structure of FIG. 1. In the FIG. 2 construction, a "print" 20 of the projectile is made in the first end laminate 22 and is similarly made in center laminate 24 and the other end, outboard, or exit laminate 26. However, a certain amount of cracking occurs in the second laminate 24 and a still greater amount of cracking occurs in the third laminate 26 as the projectile passes therethrough and causes displacement or folding of the laminate metal, called petalling, in the direction that the projectile is traveling. This research demonstrates that the total ballistic damage done in the laminate construction of FIG. 2 is approximately one-quarter of the ballistic damage done in the monolithic construction of FIG. 1.

Figure 3:
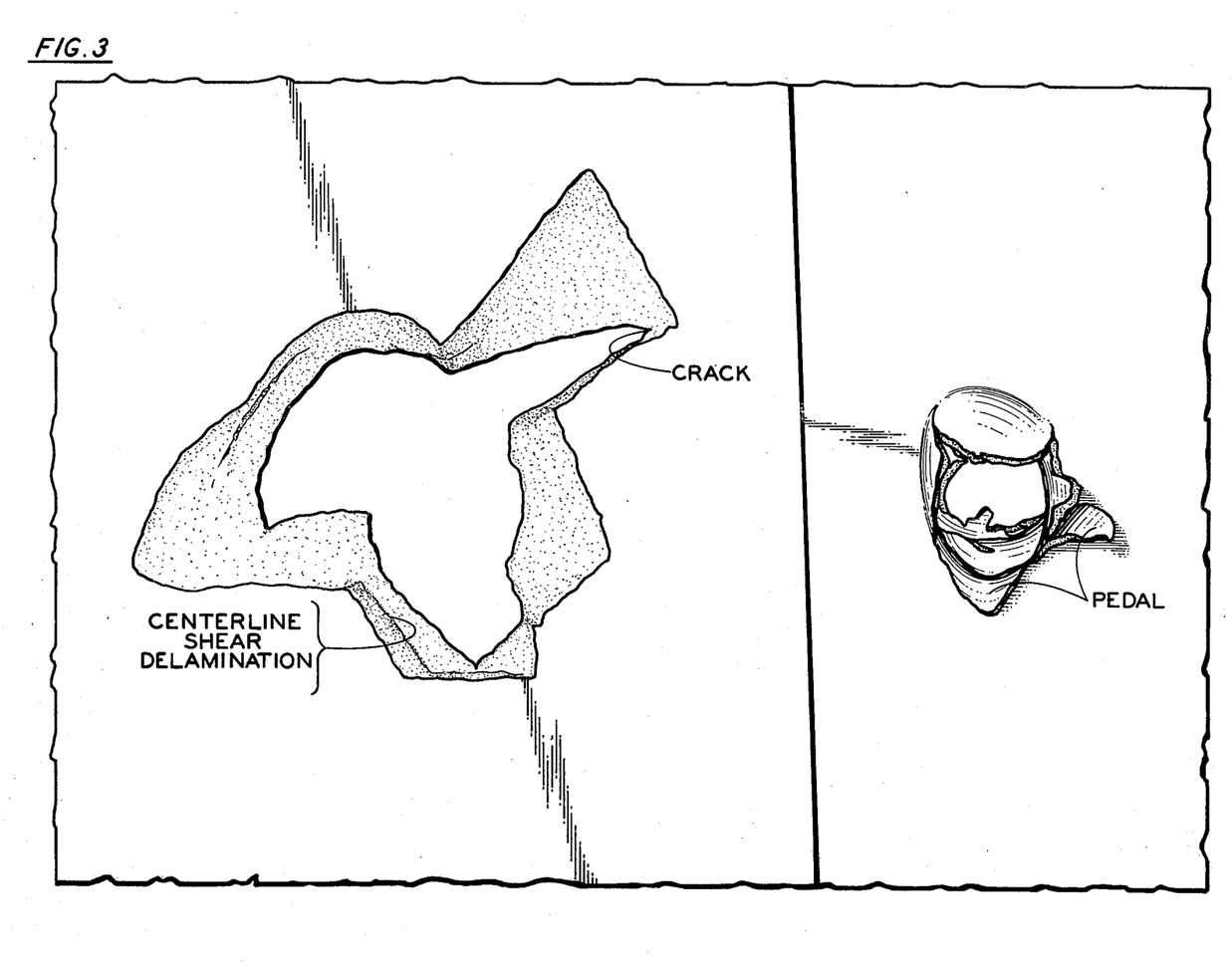
FIGS. 3 and 3a are a drawing and a photograph, respectively, of the ballistic damage to such a monolithic plate member and such a laminated plate member made of the same metal and of the same total thickness caused by precisely the same projectile hit.
Figure 3A:
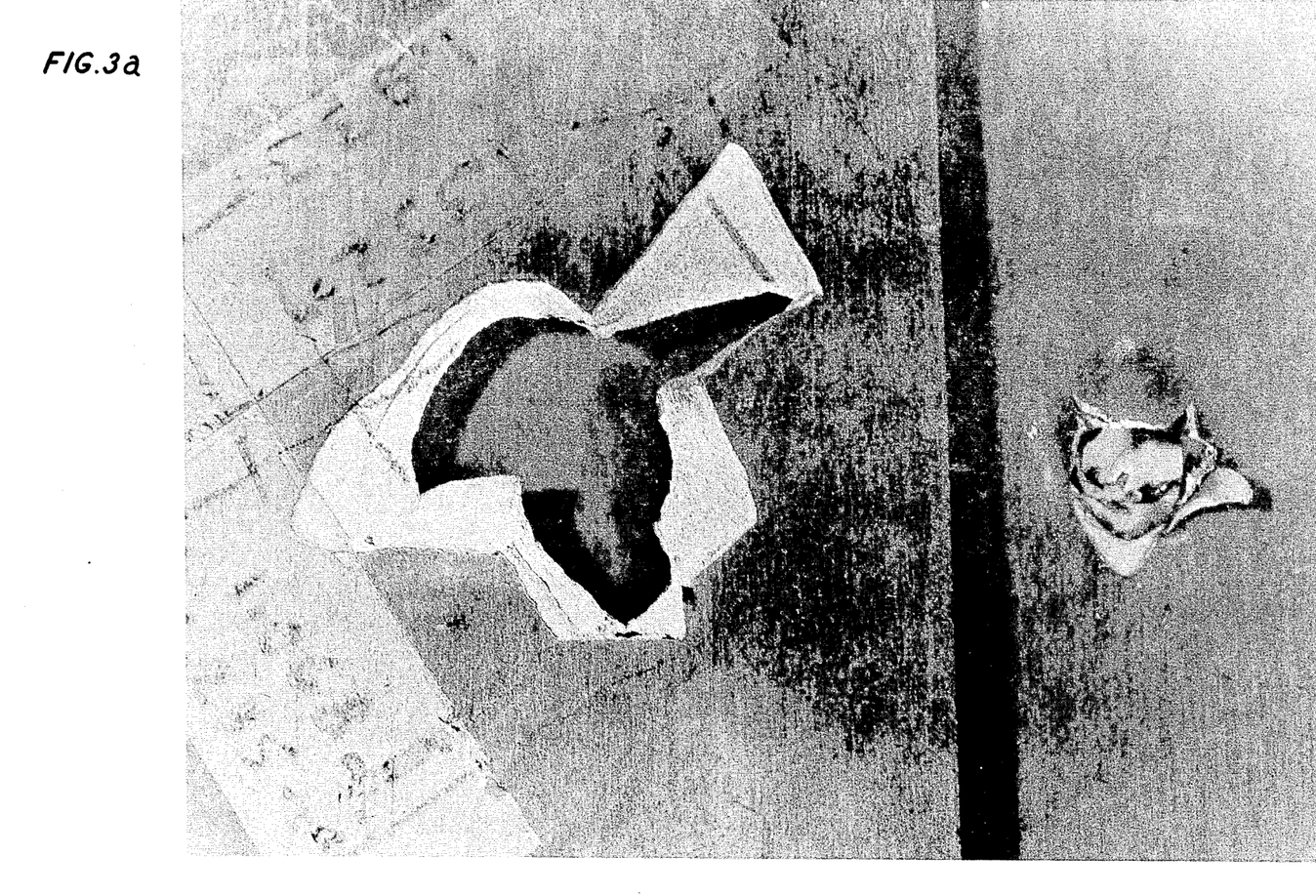
Figure 4:
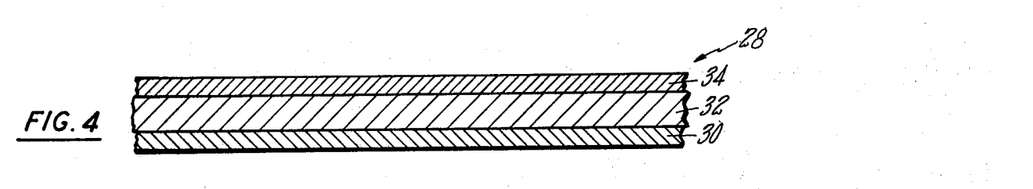
FIG. 4 is a showing of my preferred laminated plate member to illustrate that the central of the three laminates is twice the thickness of the end laminates.

The drawing shown in FIG. 3 and the photograph of FIG. 3a show on the left the ballistic damage done to the FIG. 1 monolithic construction, including a centerline shear failure, cracking and backface spall, and, on the right, the petalling effect and the overall ballistic damage done in a laminar construction of FIG. 4 of equal total thickness to the FIG. 1 monolithic and when penetrated by the same caliber projectile that penetrated the monolithic construction.

All ballistic testing done during my research and referred to herein was with a total material thickness-to-projectile diameter ratio of 1:3, where maximum ballistic damage is known to occur.

Figure 5:
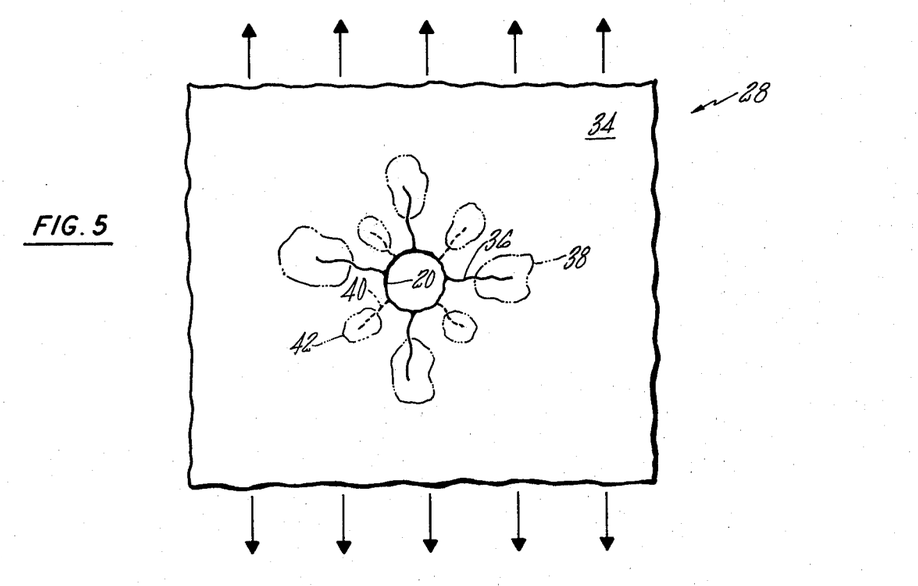
FIG. 5 is a top showing of a laminated plate member of the type shown in FIG. 4 and which has been impacted by a projectile which has passed therethrough to leave its "print" and illustrating lateral damage in the laminates and the damage reducing effects of the elastomer-modified epoxy used to bond the laminates.

In my preferred laminate construction 28 shown in FIG. 4, which is of the same strength as the FIG. 2 construction, three laminates are again used so as to be of the same total thickness as the monolithic construction of FIG. 1 and the equal thickness laminate construction 18 of FIG. 2 but in the FIG. 5 construction the center laminate is twice the thickness of end laminates 34 and 30. In my FIG. 5 construction, the end, outboard, or exit laminate 34, through which the projectile will exit the laminate plate 28, is made of a material so as to be of selected thickness and yield strength so that the petals formed in laminate 34 by the projectile impacting and passing therethrough are deformable or displaceable by control force being exerted thereagainst by the parts with which the aircraft control component which includes laminar plate 28 coacts following ballistic damage to thereby permit continued operation of the control. Due to this deformability of the exit laminate petals, the component has improved ballistic tolerance so that it can survive ballistic damage and remain operable.

It is important to my laminar construction shown in FIG. 4 that the laminates 30–34 are bonded together by an elastomer-modified epoxy so as to give the adhesive the maximum amount of elasticity at failure (e), which is preferably 30–60%. The importance of such a bonding agent or adhesive in improving the strength of laminar plates 28 or 18 is best understood by examining FIG. 5 which is a top view of the laminar plate 28 of FIG. 4, exhibiting the projectile "print" 20 and the laminate cracking and petalling damage caused by projectile impact and the passage of the projectile through the laminates. One such crack in the exit laminate 34 is shown at 36 and a representation 38 of the unfailed adhesive between laminates 34 and 32 is depicted surrounding the leading edge of crack 36. Since the adhesive 38 has not failed, crack 36 cannot propagate therebeyond. Similarly, cracks 40 in laminate 32 encounters unfailed regions 42 of the adhesive between laminates 30 and 32 to prevent crack propagation therebeyond. This elastomer-modification of the epoxy results in a more compliant adhesive resulting in less adhesive damage and delamination after ballistic penetration.

Figure 6:
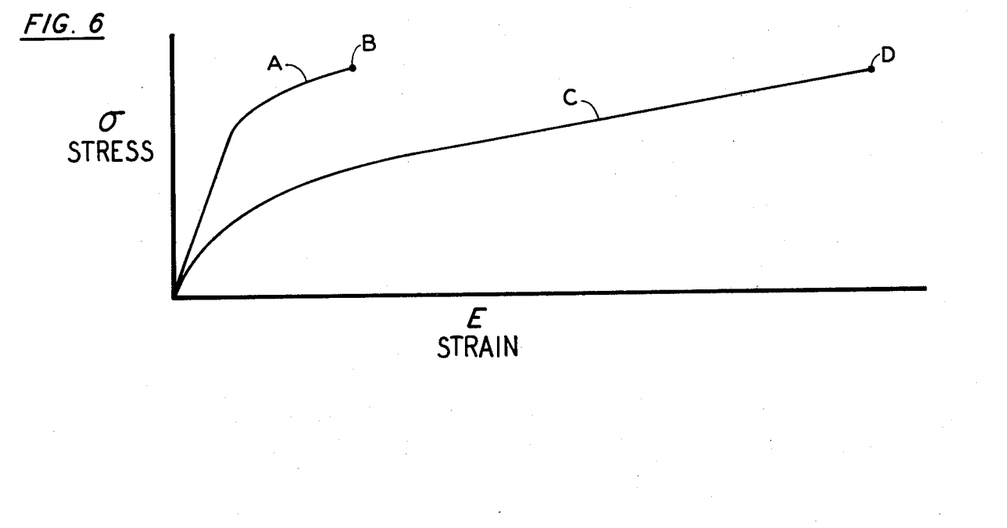
FIG. 6 is a stress-strain curve for a metallic laminate and the elastomer-modified epoxy adhesive layer to show that the metal laminate fails first and that the adhesive does not fail until substantially greater strain in the order of 6:1 or 8:1 is experienced.

FIG. 6 is a stress-strain graph for such a metal laminate as 34 shown in curve A, which fails at point B, (elasticity (e) at failure approximately 8%), and the adhesive bonding layer shown in curve C, which fails at point D, and whose elasticity at failure (e) is about 50%.

It will therefore be seen that my laminar plate member 28 is strengthened by the use of this type of adhesive because this shear carrying capability of the adhesive must be overcome before the crack can continue to propagate. By viewing FIG. 6, it will be observed that the laminate represented by curve A, which may be exit laminate 34, fails at point B but the adhesive to which it is bonded does not fail until a substantially greater strain, in the order of 3:1 or 8:1 greater, is experienced at point D and therefore the crack in the laminate cannot propagate further until the adhesive so fails at this increased stress condition.

An elastomer-modified epoxy of desired qualities is sold by the Narmco Materials, Inc., of Costa Mesa, Calif., and sold under the designation M-1113.

Research in ballistic testing of laminated plates shows that damage became greater in successive laminates and the three-laminate construction plate was selected as the best compromise between survivability and redundancy.

Figure 7:
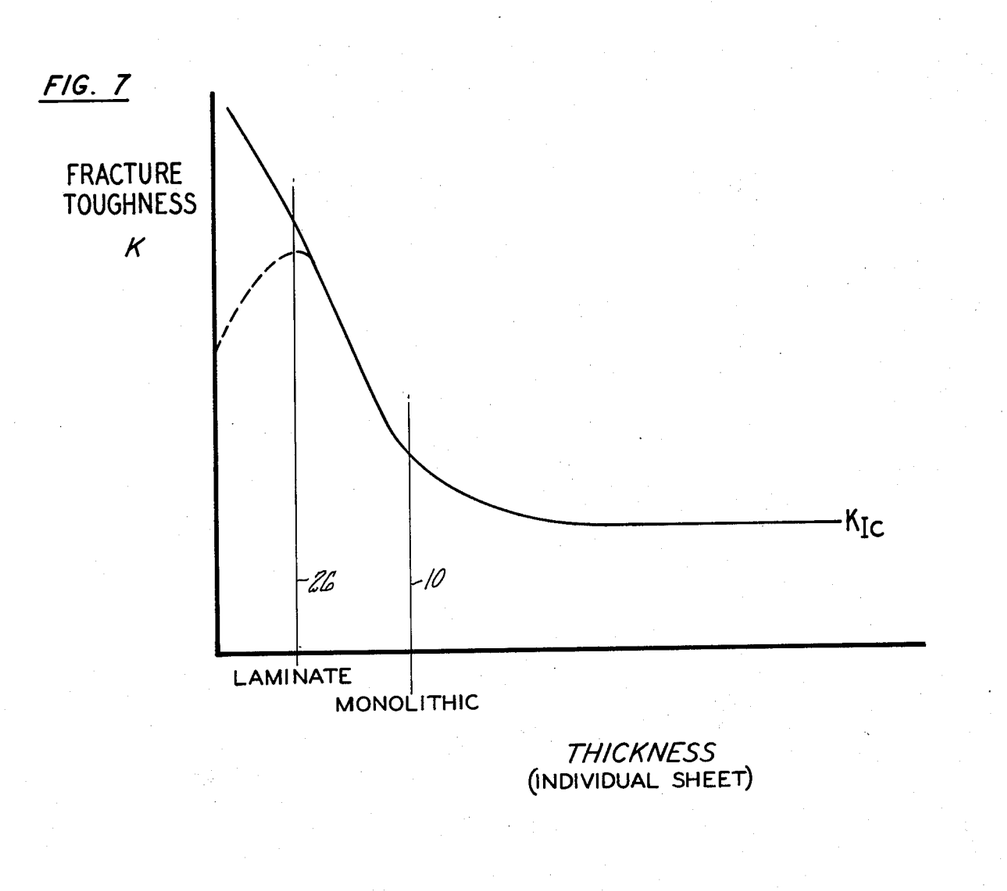
FIG. 7 is a graph of fracture toughness plotted against sheet thickness to illustrate that a monolithic member of selected thickness has substantially less fracture toughness than a laminate member roughly one-third that thickness.

The second reason why the laminar construction has increased strength over the monolithic construction can be appreciated by viewing FIG. 7, which is a graph of fracture toughness (K) plotted against sheet thickness (of a sheet metal part being penetrated by a projectile). It will be noted by observing this curve that the fracture toughness of the monolithic member 10 is substantially one-half that of a laminate, such as 26, which is one-third the thickness of monolithic member 10 and, of course, the fracture thickness of the still thinner end laminate 34 of FIG. 4 is still greater.

It will therefore be seen that the laminar plate construction is superior to the monolithic construction both because of the greater fracture toughness of the thinner laminates and the strength-adding quality of the particular adhesive. The laminar plate construction is further superior because, when the FIG. 4 preferred embodiment is utilized, the thin exit laminate 34 presents petals which are easily deformable by interference at control pressure with cooperating parts following ballistic damage to thereby avoid secondary jamming of parts and permit continued operation of the parts so fabricated.

Figure 8:
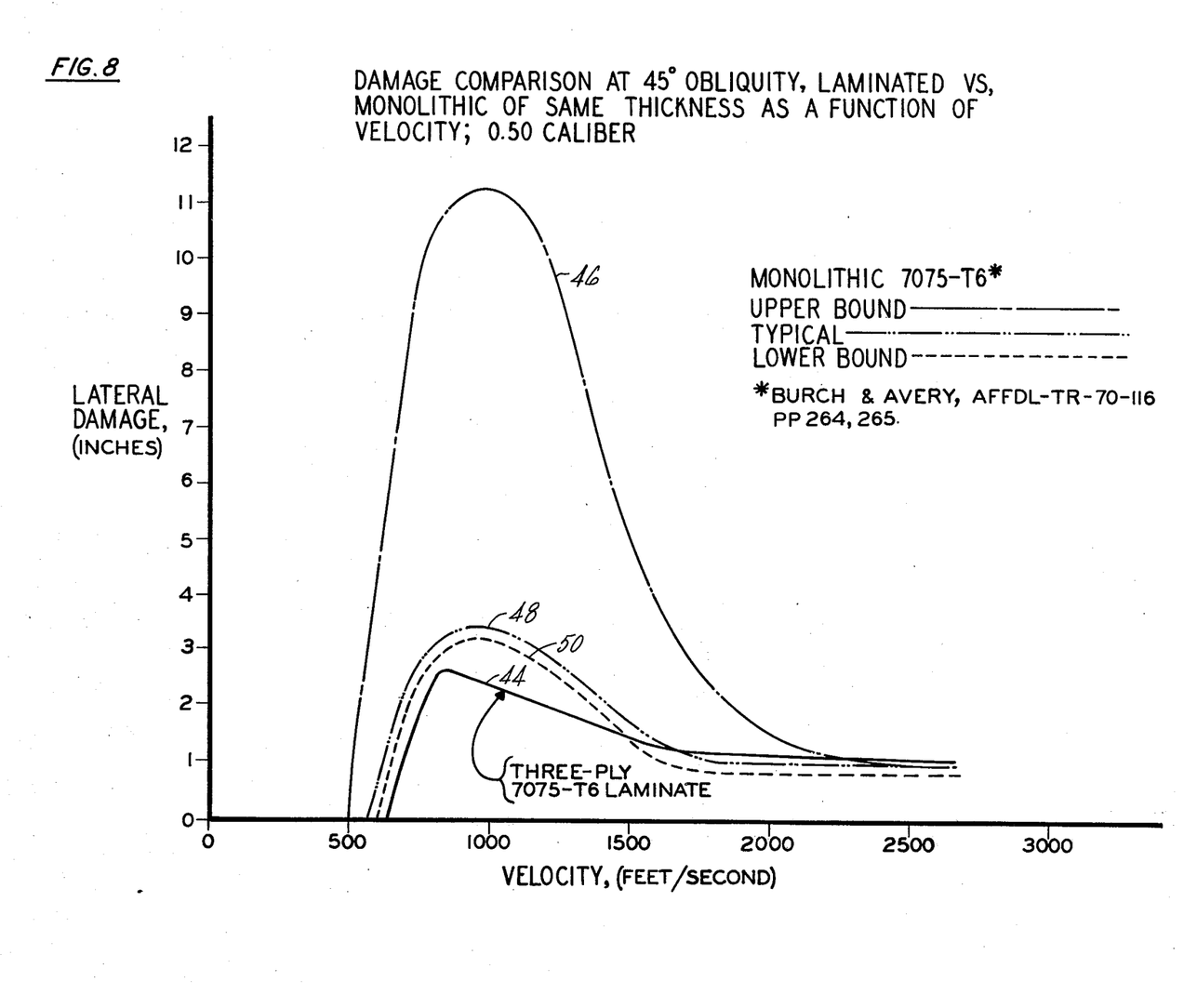
FIG. 8 is a curve of lateral damage in a laminate plate member of the type depicted in FIG. 4 and a monolithic plate member of comparable thickness and the same material when impacted by a projectile of 12.7 millimeters at 45° obliquity and at various projectile velocities.

FIG. 8 demonstrates the improved performance from a lateral damage standpoint, that is the total damage of projectile hole, cracks and tears, of my preferred laminar plate FIG. 4 construction, as depicted thereon by curve 44 with zero scatter 24, when compared to a monolithic construction of equal thickness, both of which were fired into at 45° obliquity with a 12.7 millimeter projectile, and with the upper, typical and lower bounds of the monolithic construction damage depicted by curves 46, 48 and 50. The material for both the monolithic and laminate construction was aluminum 7075-T6. 7075-T6 is an Aluminum Industry Standard designation. Similar advantage of the laminar construction over the monolithic was achieved using a 7.62 millimeter projectile. My test results showed lateral damage reduced by 3:1 and 4:1 ratios for laminate construction versus monolithic construction when impacted by 7.62 millimeter caliber and 12.7 millimeter caliber projectiles, respectively.

Figure 9:
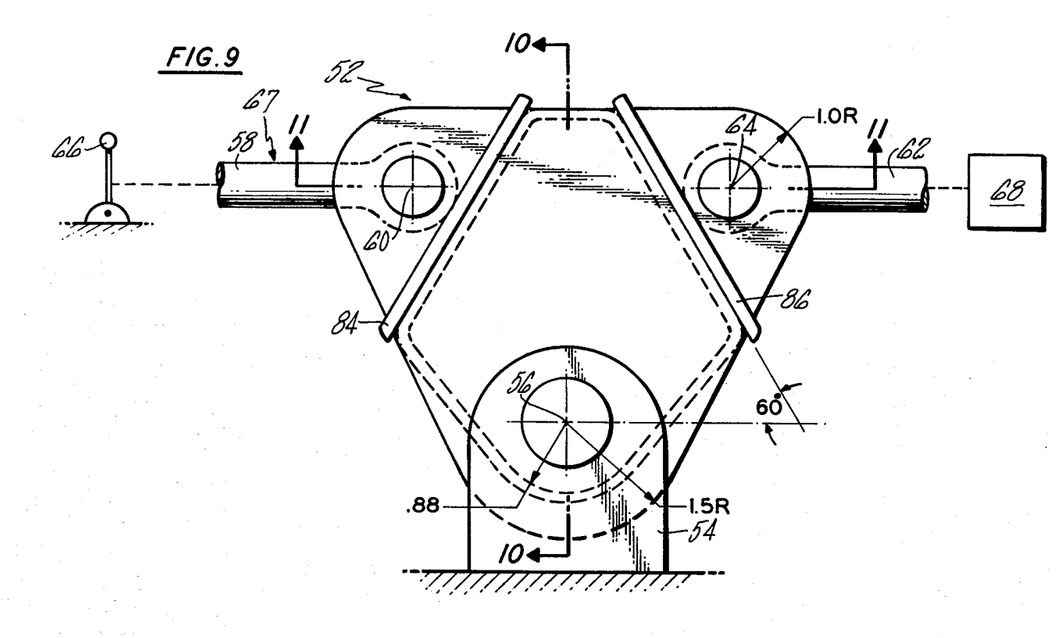
FIG. 9 is a showing of a bellcrank utilizing my teaching and forming part of an aircraft control system cooperating with other relatively movable parts thereof in interconnecting the control input mechanism to the controlled mechanism.

FIG. 9 shows a bellcrank fabricated utilizing my preferred construction so as to achieve improved ballistic tolerance. Bellcrank assembly 52 is mounted from a conventional aircraft fixture 54 so as to be pivotable about pivot point 56. Input rod 58, which may be either pilot-operated or automatic pilot-operated, is pivotally connected to bellcrank 52 for pivot motion about axis 60, while output rod 62 is pivotally connected to bellcrank 52 for pivot motion about pivot axis 64. In this fashion, the action of the pilot control stick 66, or other appropriate mechanism, is imparted to bellcrank 52 through input rod 58 to cause the bellcrank to pivot either in a clockwise or a counterclockwise direction about pivot axis 56 and to impart a similar motion to controlled element 68 through output rod 62. Controlled element 68 may be any aircraft part under pilot control, such as an aileron or helicopter tail rotor. In all likelihood there will be several other bellcranks, connecting rods, idlers, etc., in the interconnecting chain 67 between input control member 66 and controlled member 68, however, the FIG. 9 construction has been selected for purposes of simplification.

Figure 10:
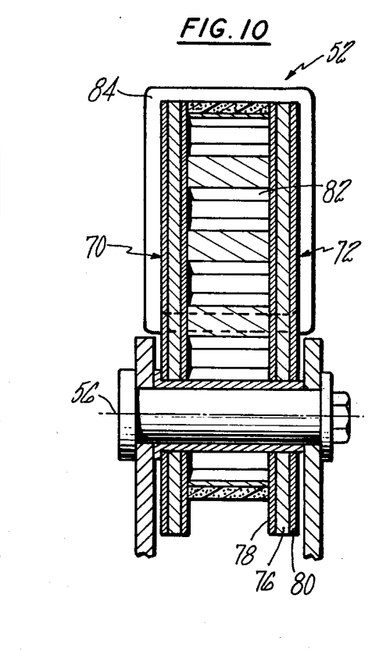
FIG. 10 is a view taken along line 10—10 of FIG. 9.
Figure 11:
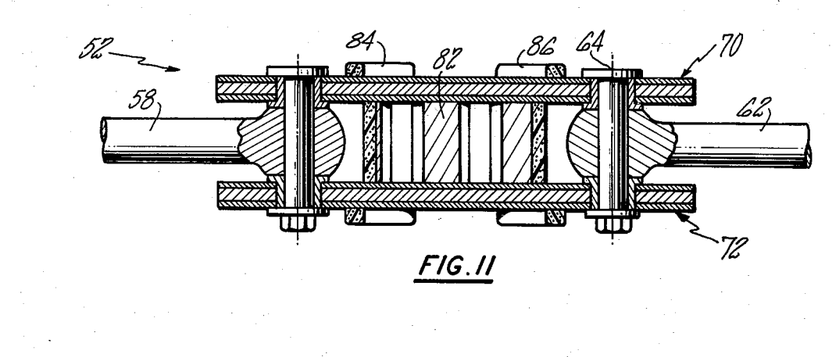
FIG. 11 is a view taken along line 11—11 of FIG. 9.

As best shown in FIGS. 10 and 11, bellcrank 52 includes sideplate members 70 and 72, which are of identical construction. Each of the sideplate members 70 and 72 consist of a center laminate 76 and end laminates 78 and 80 bonded together with the elastomer-modified epoxy previously described and with central laminate 76 twice the thickness of end laminates 78 and 80. Sideplate members 70 and 72 are bonded to and selectively separated by spacer member 82, which is preferably made of honeycomb and which is preferably either foam filled or wrapped with high strength fiberglass filament, which is epoxy impregnated and cured, to make spacer member 82 waterproof.

My research demonstrated that three laminate construction is optimum in the formation of faceplates 70 and 72, both because of increased petalling in the order of laminae penetrated and because added adhesive layers add to the total weight of the part. The three-ply construction gives sufficient redundancy while limiting the damage due to transmittal shock.

In my preferred construction, spacer 82 is made of 2.3 pounds per foot cubed aluminum honeycomb, although Nomex ® could have been used, and laminates 76–80 are made of aluminum 7075-T6 with the end laminates 78 and 80 being of thickness 0.040 inches and center laminate 76 being of thickness 0.081. This material is known to have a yield strength of 64,000psi. My research demonstrated that appropriately deformable petals were formed when the end laminate of 7075-T6 aluminum was 0.040 inches. My control force available to deform the petals was 970 pounds. The control force available to effect petal deformation in a typical helicopter control system is about 1,000 pounds. Since the force required to yield thin sheet is equal to the inverse of the square root of the thickness of the material, i.e., $F_{TY} \approx 1/\sqrt{t}$, where $F_{TY}$ equals tensile yield and it equals material thickness, other appropriate materials can be selected for the laminates 76–80, or the exit laminate 80 only, since the material yield strength will be known and the laminates can be made of appropriate thickness to perform this deformable petalling function by use of the equation:

$$\frac{F_{TY}|_1}{F_{TY}|_2} = \sqrt{\frac{t_2}{t_1}}$$

where $F_{TY}|_1$ is the yield strength of aluminum 7075-T6, that is 64,000psi, where $t_1$ is the thickness of my tested aluminum 7075-T6 exit laminate 80, that is 0.040", where $F_{TY}|_2$ is the known yield strength of the new laminate material, and where $t_2$ is the thickness of the new exit laminate material. My testing did not go beyond the proving of acceptable petalling performance for 0.040" thick exit laminate 80 of aluminum 7075-T6 in the FIG. 9–11 construction where all laminates were aluminum 7075-T6 and the adhesive was M-1113, therefore those skilled in the art will realize that a thicker exit laminate of aluminum 7075-T6 may also be acceptable, as might a 0.040" exit laminate of a second material of lower yield strength. While my research resulted in deformation of the petalled exit laminate, if a more brittle material were used such as beryllium, the petals would probably shear off. Either petal deformation or shear-off is acceptable to continued operation. The laminates could be made of Ti-6Al-4V (titanium 6 aluminum 4 vanadium), or $T_i$-15V-3al-3Cr-3Sn titanium or similar sheet titanium alloy, steel, magnesium or bonded fiber construction depending upon the requirements of the installation involved. In my preferred embodiment, the thickness of spacers 82 was selected so as to separate plate members 70 and 72 by a dimension of one inch and bushing members were utilized so as to separate pivot axes 60 and 64 by four inches and pivot axes 60 and 64 from pivot axis 56 by three inches as shown in FIG. 9.

Figure 12:
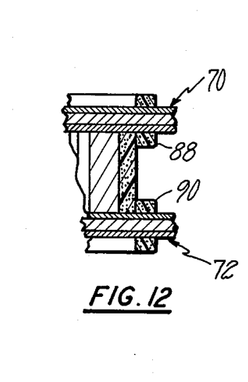
FIG. 12 is a partial showing of the bellcrank shown in FIG. 9 to illustrate the application of sacrificial strap members to the sideplate members individually.

As best shown in FIG. 9, I provide sacrificial bands 84 and 86 wrapped completely around the ears of bellcrank 52. These sacrificial bands are made of unidirectional epoxy impregnated fiberglass filaments wrapped around the exterior of the bellcrank 52 as shown and cured in place so as to be connected thereto. The specific property, i.e. tensile strength, of the fiberglass filament and the number of wrappings of the filament around the bellcrank 52 are selected so that the failing load of the sacrificial straps 84 and 86 equals the force applied by the anticipated projectile to the laminate plate members 70 and 72. In the process of holding the laminates together, these sacrificial bands serve to absorb the initial projectile loading while the laminates remain in their original position and no peel-type of loading is imposed upon the laminates until the sacrificial straps fail. This is why the strength of the sacrificial straps is selected to be equal to the load imposed upon the laminate plate members 70 and 72 by the projectile. While I show straps 84 and 86 wrapped around the entire bellcrank member 52 in my FIG. 9 construction, also, or as best shown in FIG. 12, individual sacrificial straps 88 and 90 could in the alternative, be wrapped around appropriate stations on the individual plate members 70 and 72.

I wish it to be understood that I do not desire to be limited to the exact details of construction shown and described, for obvious modifications will occur to a person skilled in the art.

I claim:

1. An aircraft control system component adapted to cooperate with and move relative to associated parts in performing a control function on an aircraft comprising:
   (A) a first sideplate member,
   (B) a second sideplate member,
   (C) a spacer member positioned between and joined to said sideplate members to selectively space said sideplate members, and
   (D) each of said sideplate members comprising three bonded laminates with the central laminate twice the thickness of the other laminates and with the outboard laminate of selected thickness and yield strength that the petals formed therein by a projectile impacting and passing therethrough are reasonably deformable by interference with associated parts following such ballistic damage so as to improve the ballistic damage tolerance of the component and permit its continued operation.

2. Apparatus according to claim 1 wherein said component is a bellcrank.

3. A component according to claim 1 wherein said laminates are bonded together by an elastomer-modified epoxy.

4. Apparatus according to claim 3 wherein said elastomer-modified epoxy has an elasticity at failure of 50%.

5. Apparatus according to claim 3 wherein said spacer member is fabricated of aluminum honeycomb.

6. Apparatus according to claim 5 wherein said aluminum honeycomb is 2.3 pounds per foot cubed and of 1.000 inches height, and wherein said laminates are made of 7075-T6 aluminum, having a yield strength of about 64,000psi, and further wherein said central laminate is 0.081 inches thick, and said other laminates are 0.040 inches thick.

7. Apparatus according to claim 5 wherein said laminates are made of Ti-6 Al-4 V titanium or Ti-15V-3Al-3Cr-3Sn titanium or similar sheet titanium alloy.

8. Apparatus according to claim 5 wherein said laminates are made of 7075-T6 aluminum.

9. Apparatus according to claim 8 and including means to waterproof said spacer member.

10. Apparatus according to claim 8 and including at least one sacrificial strap enveloping and bonded to said component and comprising a high modulus filament member of selected tensile strength and wrapped around the component a selected number of times so that the sacrifical strap failing load is equal to the force anticipated to be applied to the sideplate members by projectile impact and pass-through.

11. Apparatus according to claim 10 wherein such a sacrificial band is wrapped around each sideplate member at at least one station.

12. Apparatus according to claim 1 and including at least one sacrificial strap enveloping and bonded to said component and comprising a high modulus filament member selected tensile strength and wrapped around the component a selected number of times so that the sacrificial strap failing load is equal to the force anticipated to be applied to the sideplate members by projectile impact and pass-through.

13. Apparatus according to claim 12 wherein such a sacrificial band is wrapped around each sideplate member at at least one station.

14. An aircraft flight control system comprising:
(A) pilot actuated control input means,
(B) controlled means remote from said input means,
(C) means connecting said input means to said control means so that said input means is effectively interconnected to said controlled means to control same and including:
  (1) a plurality of interlinked and coacting parts adapted to cooperate with and move relative to associated parts in performing the control function and having at least one component comprising:
    (a) a first sideplate member,
    (b) a second sideplate member,
    (c) a spacer member positioned between and joined to said sideplate members to selectively space said side plate members, and
    (d) each of said sideplate members comprising three bonded laminates with the central laminate twice the thickness of the other laminates and with the outboard laminate of selected thickness and yield strength that the petals formed therein by a projectile impacting and passing therethrough are reasonably deformable by interference with associated parts following such ballistic damage so as to improve the ballistic damage tolerance of the component and permit its continued operation.

15. Apparatus according to claim 14 wherein said component is a bellcrank.

16. A system according to claim 14 wherein said laminates are bonded together by an elastomer-modified epoxy.

17. Apparatus according to claim 16 wherein said elastomer-modified epoxy has an elasticity at failure (e) of 50%.

18. Apparatus according to claim 17 wherein such a sacrificial band is wrapped around each sideplate member at at least one station.

19. Apparatus according to claim 16 wherein said spacer member is fabricated of aluminum honeycomb.

20. Apparatus according to claim 19 wherein said laminates are made of Ti-6 Al-4V titanium.

21. Apparatus according to claim 19 wherein said aluminum honeycomb is 2.3 pounds per foot cubed and of 1.000 inches height, and wherein said laminates are made of 7075-T6 aluminum having a yield strength of about 64,000psi, and further wherein said laminate is 0.081 inches thick, and said other laminates are 0.040 inches thick.

22. Apparatus according to claim 19 wherein said laminates are made of 7075-T6 aluminum.

23. Apparatus according to claim 22 and including means to waterproof said spacer member.

24. Apparatus according to claim 22 and including at least one sacrificial strap enveloping and bonded to said component and comprising a high modulus filament member of selected tensile strength and wrapped around the component a selected number of times so that the sacrificial strap failing load is equal to the force anticipated to be applied to the sideplate members by projectile impact and pass-through.

25. A laminated plate member comprising:
(A) a first sideplate member,
(B) a second sideplate member,
(C) a spacer member positioned between and joined to said sideplate members to selectively space said sideplate member,
(D) each of said sideplate members comprising three bonded laminates with the central laminate twice the thickness of the other laminates and with the outboard laminate of selected thickness and yield strength that the petals formed therein by a projectile impacting and passing therethrough are reasonably deformable by interference with associated parts following such ballistic damage so as to improve the ballistic damage tolerance of the component and permit its continued operation, and
(E) at least one sacrificial strap enveloping and bonded to said plate member and comprising a high modulus filament member of selected tensile strength and wrapped around the plate member a selected number of times so that the sacrificial strap failing load is equal to the force anticipated to be applied to the plate members by projectile impact and passthrough.

* * * * *

UNITED STATES PATENT AND TRADEMARK OFFICE
CERTIFICATE OF CORRECTION

PATENT NO. : 4,161,125
DATED : July 17, 1979
INVENTOR(S) : William G. Degnan

It is certified that error appears in the above-identified patent and that said Letters Patent are hereby corrected as shown below:

Column 7, Line 3   After "sheet" insert --metal--

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,161,125
DATED : July 17, 1979
INVENTOR(S) : William G. Degnan

It is certified that error appears in the above-identified patent and that said Letters Patent are hereby corrected as shown below:

Insert under References Cited, front page - Column 2, the following patents which were omitted in the printing of the patent:

| | | |
|---|---|---|
| 3,179,553 | 4/1965 | Franklin.......2/2.5 |
| 2,279,110 | 4/1942 | Collins......109/82 |
| 3,577,306 | 5/1971 | Baker et al....2/2.5 |
| 3,320,619 | 5/1967 | Lastnik et al..2/2.5 |
| 3,962,976 | 6/1976 | Kelsey.......109/82 |
| 787,065 | 4/1905 | White.........89/36A |
| 4,030,378 | 6/1977 | Kroesser......74/469 |

FOREIGN PATENTS OR APPLICATIONS 227,168   8/1943   Switzerland....109/84

Signed and Sealed this

Twenty-fifth Day of March 1980

[SEAL]

Attest:

SIDNEY A. DIAMOND

Attesting Officer

Commissioner of Patents and Trademarks